United States Patent [19]
Anderson et al.

[11] 3,720,052
[45] March 13, 1973

[54] HAYSTACKING MACHINE

[75] Inventors: Joseph A. Anderson, Minot, Chester G. Neukom, Jamestown, both of N. Dak.

[73] Assignee: Haybuster Manufacturing, Inc., Jamestown, N.D.

[22] Filed: May 3, 1971

[21] Appl. No.: 139,892

Related U.S. Application Data

[63] Continuation of Ser. No. 858,999, Sept. 18, 1969, abandoned.

[52] U.S. Cl. ................................56/346, 214/521
[51] Int. Cl. ..........................................A01d 87/02
[58] Field of Search........56/344, 345, 346, 347, 348, 56/349, 361, 364, 474–476, 480; 214/505, 506, 519, 520, 521, 83, 83.14, 83.18, 83.36, 83.34; 198/9

[56] References Cited

UNITED STATES PATENTS

| | | | |
|---|---|---|---|
| 1,704,190 | 3/1929 | Hall | 56/346 |
| 1,919,896 | 7/1933 | MacGregor | 56/364 |
| 2,292,280 | 8/1942 | McGuire et al. | 56/345 |
| 2,328,790 | 9/1943 | Dorsey | 56/346 |
| 2,581,486 | 1/1952 | Jamieson | 56/347 |
| 2,648,945 | 8/1953 | Harrington | 56/346 |
| 2,748,965 | 6/1956 | Grey | 214/505 |
| 3,110,148 | 11/1963 | Mader et al. | 56/347 |

*Primary Examiner*—Russell R. Kinsey
*Attorney*—Dugger, Peterson, Johnson & Westman

[57] ABSTRACT

A hay stacking assembly which includes a pickup for picking loose hay up from a window and conveying it into a stacker assembly that has a stack support bed that rotates as the stacker moves. Means are provided for packing the hay into the stacker assembly until a complete hay stack is formed. When the hay stack is formed, the packed hay stack is removed from the stacker bed through the use of a push off device, and the unit is then again used for making another hay stack.

The unit can be used as a hay stack mover if desired upon the application of proper hay stack loading means.

22 Claims, 8 Drawing Figures

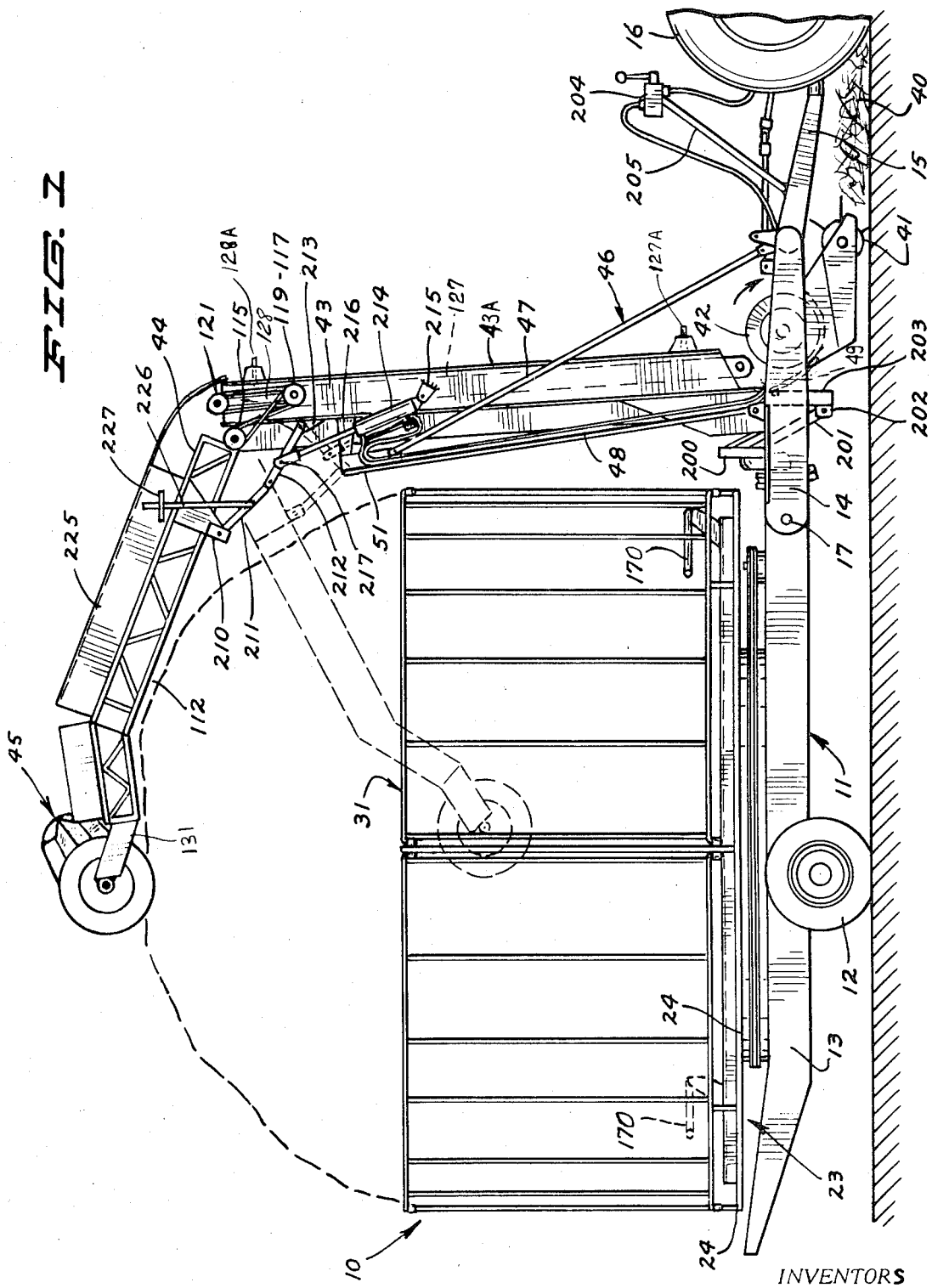

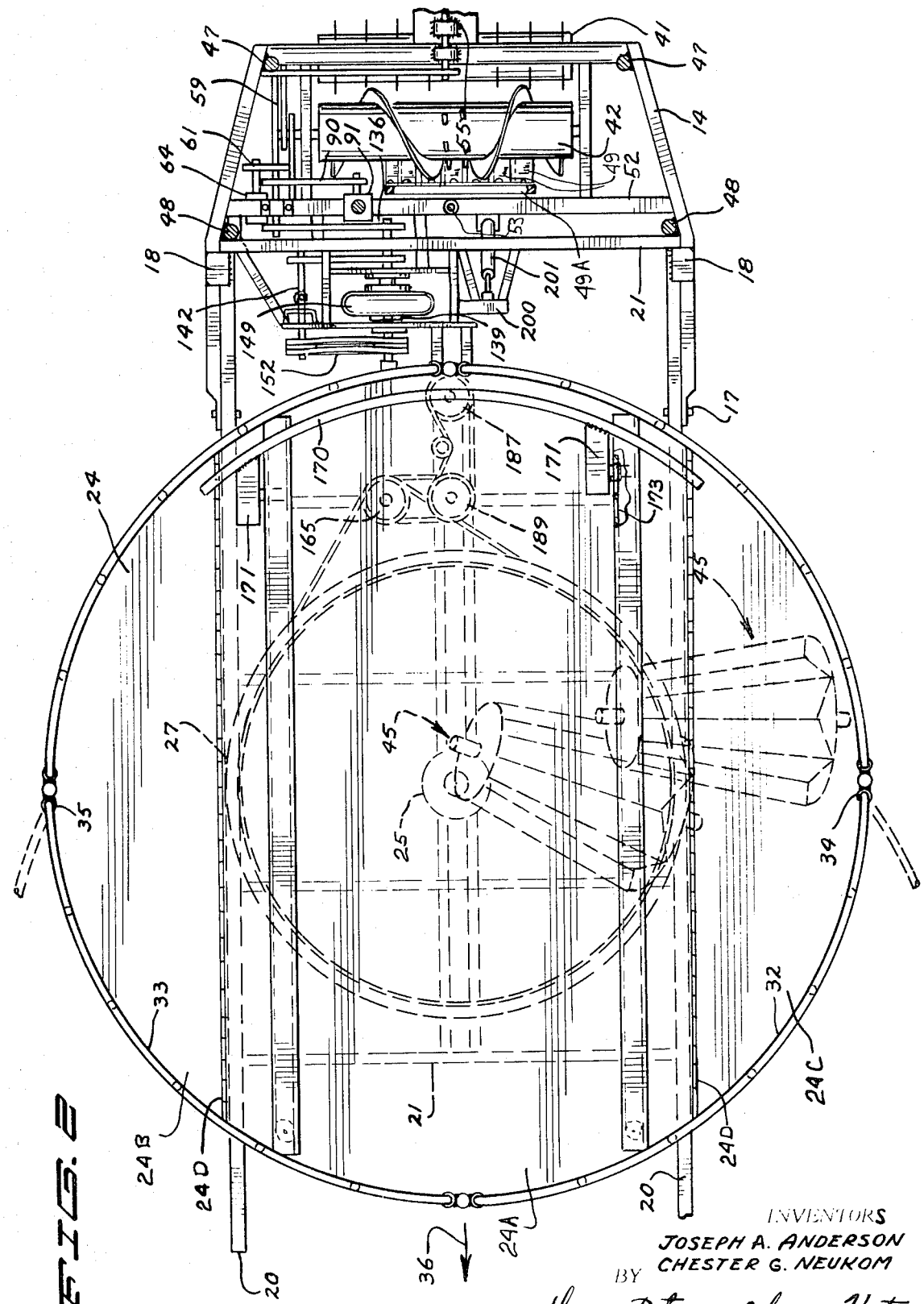

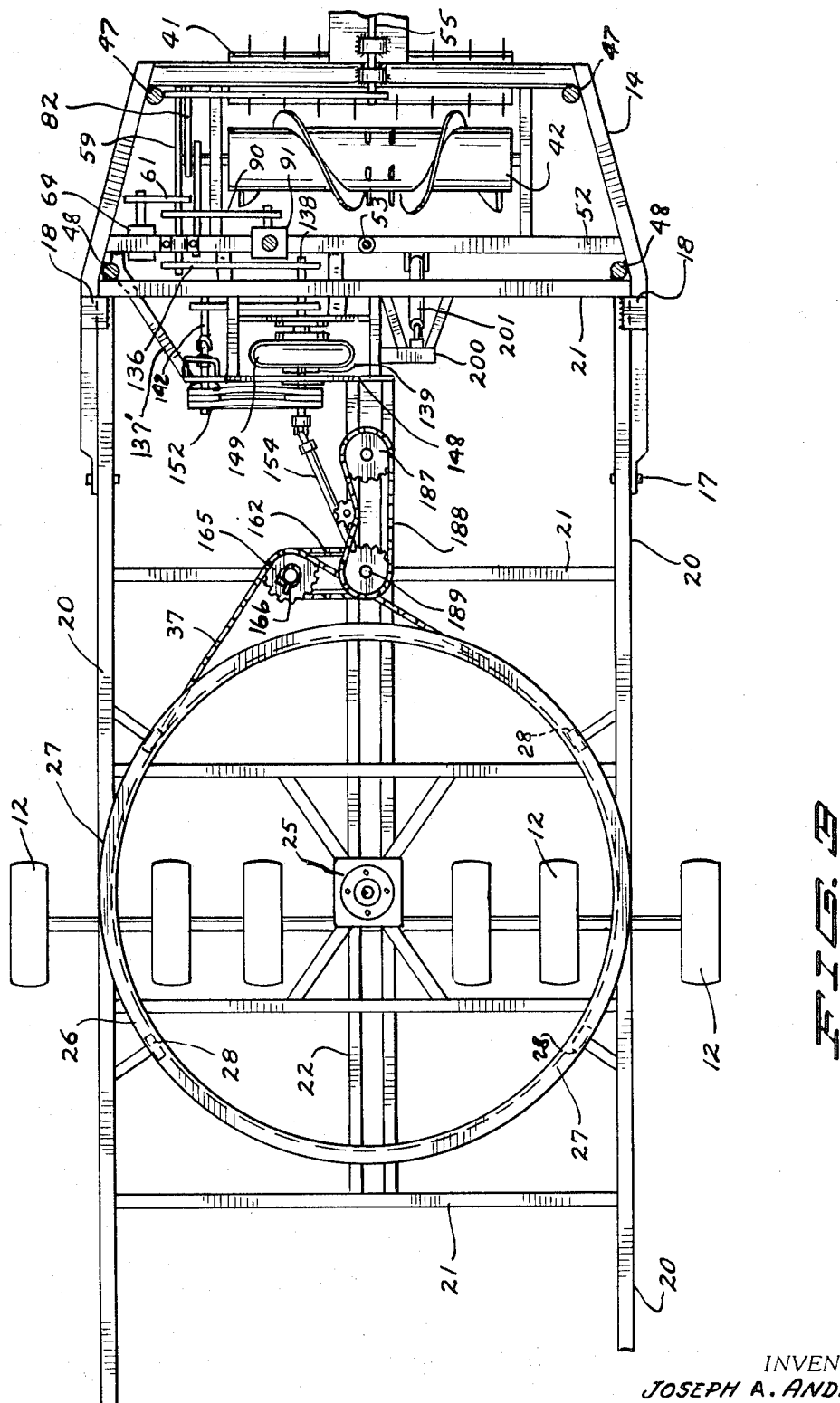

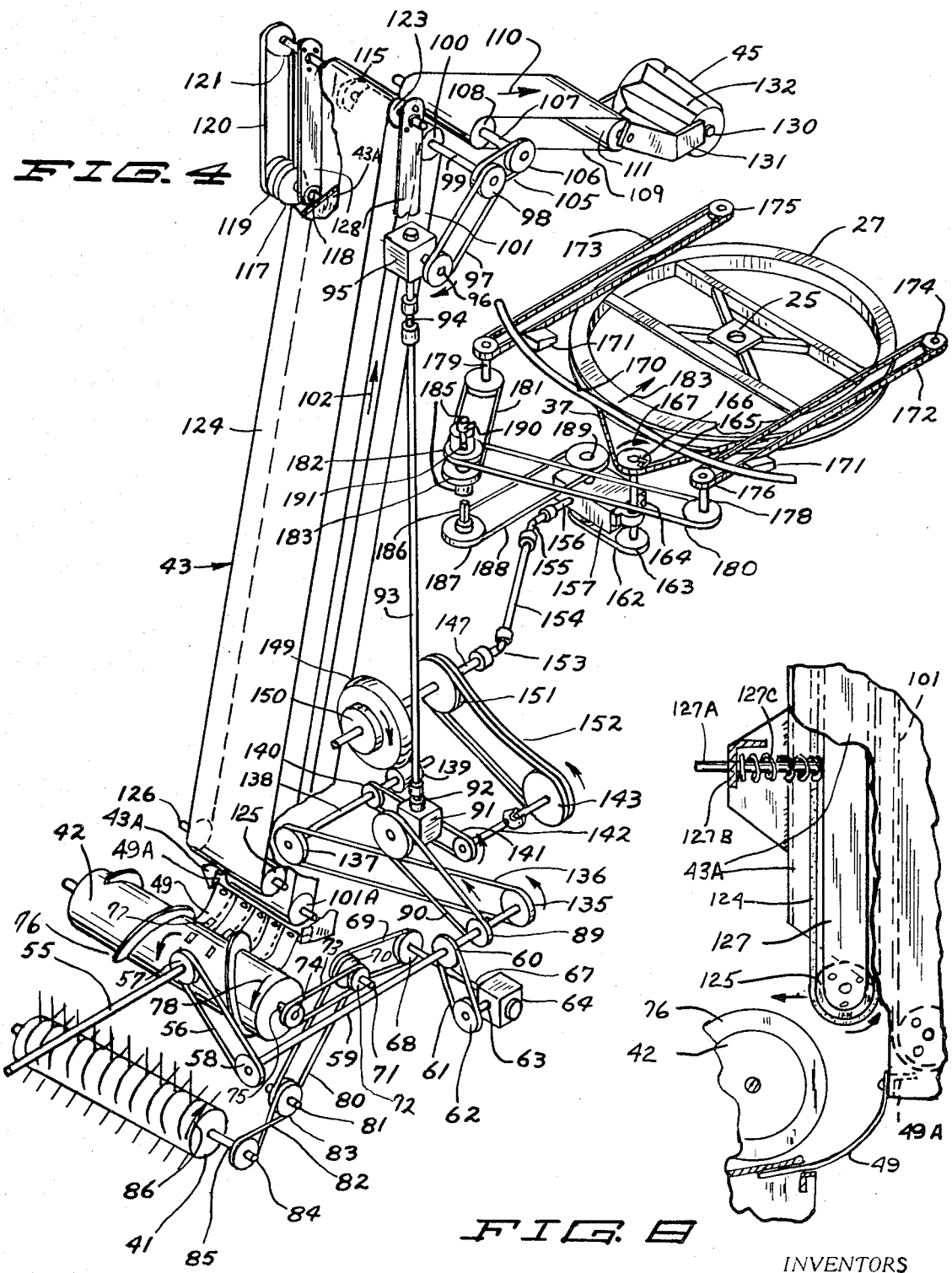

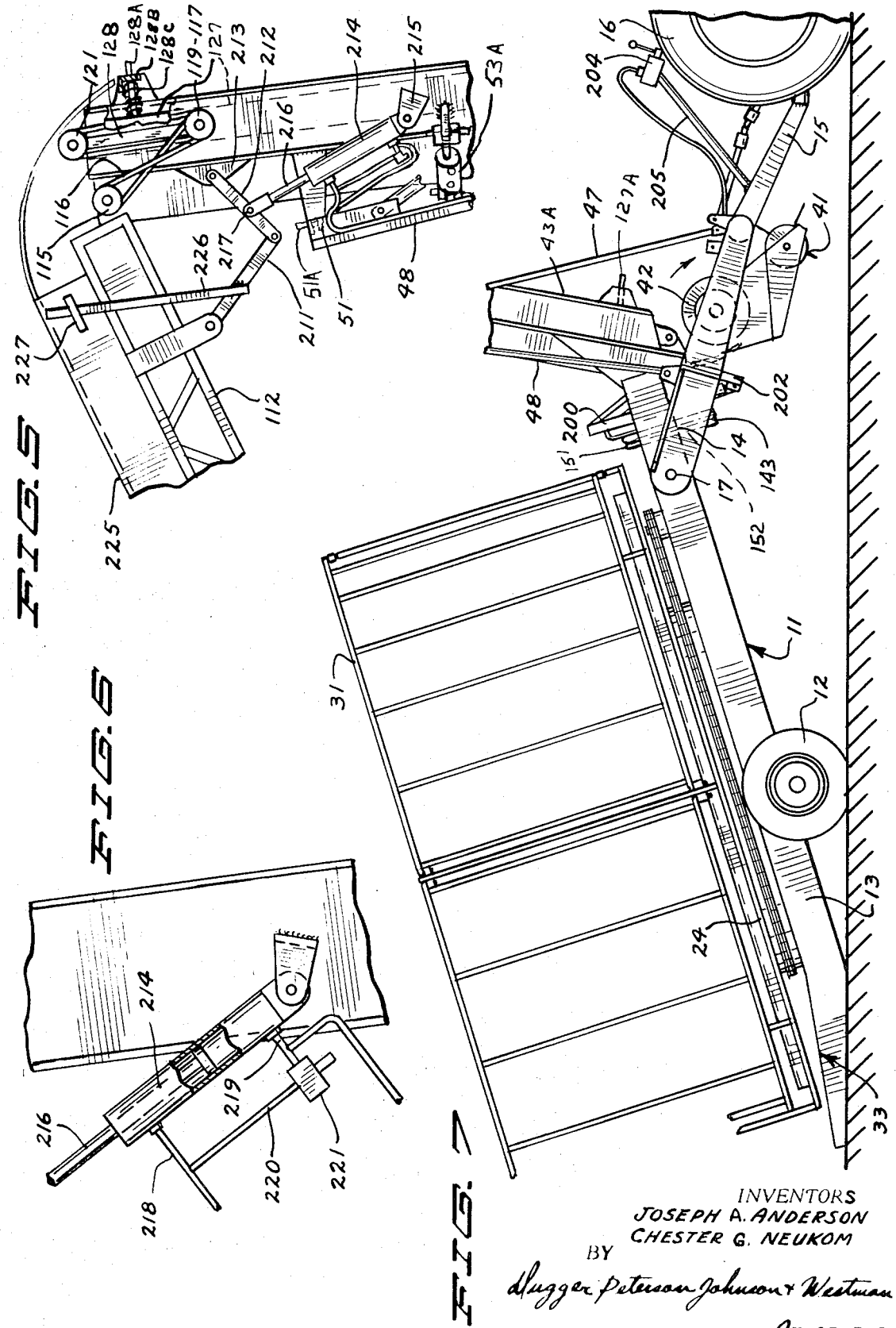

HAYSTACKING MACHINE

CROSS-REFERENCE TO RELATED APPLICATION

This application is a continuation of application Ser. No. 858,999 filed Sept. 18, 1969 and which is now abandoned.

BACKGROUND OF THE INVENTION

1. Field of the Invention

The present invention relates to mobile hay stacking machines which will form a complete hay stack in one pass down the field.

2. Prior Art

Rotating hay racks are known in the art. For example, U.S. Pat. No. 1,261,241 shows a revolving hay rack which is driven to revolve as the unit is drawn over the ground. The hay can be applied with a hay loader, according to the specification of this unit, but the unit does not have any power driven means, nor does it have unique drives for rotating the stack and then pushing the stack off the revolving rack. Hay loaders which elevate hay into a trailing rack are shown in U.S. Pat. No. 2,089,516 and U.S. Pat. No. 1,734,100. There is no teaching in any of the devices to combine the rotating hay stack bed with a loader, and utilize unique hay packing means in this combination, to provide for a uniformly packed hay stack in one pass down the field.

SUMMARY OF THE INVENTION

The present invention relates to a hay stacking device which has a power driven revolving platform for forming the stack and elevating means for placing the hay into the rack. A packer member operating under a substantially uniform packing force is provided which automatically packs the hay as the platform rotates. The lateral hay conveyor means has a shield which adjusts automatically upon raising and lowering of the conveyor means to properly guide the hay onto the stack bed. A unique drive is utilized wherein a push off device can be used in combination for removing hay stacks from the revolv-platform or bed. The push off drive and the stack rotating drive are powered from a common source but one is operative when the platform is tilted, and the other is operative when the platform is in working position.

The hay conveyor used to direct the hay onto the revolving bed can be moved from side to side for accurate placement of the hay being picked up. High speed endless conveyor belts are used for conveying the hay.

It is therefore an object of the present invention to present a hay stacking device which can form a stack without having a man pack the hay and which will provide for automatic packing uniformly as the hay is loaded. Further, it is an object of the invention to provide for a hay stack making device which will form a complete stack substantially without manual effort, and has means for removing the stack from the unit after it has been formed.

Other objects will be apparent as the description proceeds.

BRIEF DESCRIPTION OF THE DRAWINGS

FIG. 1 is a side elevational view of a hay stacking device made according to the present invention;

FIG. 2 is a top plan view of the device of FIG. 1 with parts broken away for sake of clarity and the packing device shown in dotted lines;

FIG. 3 is a view taken substantially along the same lines as FIG. 2 with the upper platform removed to show the support ring and drives for said platform;

FIG. 4 is a schematic perspective view of the drive components for the hay stacking device of the present invention showing the relationship between the elevating conveyors, the packer, and the pickup for the hay;

FIG. 5 is a fragmentary enlarged side elevational view of the vertical hay elevating conveyors and the horizontal conveyor junction;

FIG. 6 is a fragmentary enlarged view of the hydraulic cylinder used to control the horizontal elevator and exert a packing pressure on the packing roller;

FIG. 7 is a side elevational view of the device of FIG. 1 showing it in a dumped position wherein a hay stack formed on the platform can be removed; and FIG. 8 is an enlarged fragmentary side view of the upright conveyor assembly.

DESCRIPTION OF THE PREFERRED EMBODIMENT

A mobile hay stacker illustrated generally at 10 is designed for moving over the ground, picking up windrows of loose hay, putting them into a stack unit, packing it at the same time, and then permitting dumping of the hay stack.

The device has a base frame assembly 11 mounted onto support wheels 12 which are rotatably mounted so that the unit can be moved over the ground. The frame assembly 11 is in two sections including a tilting frame assembly 13 and a hitch frame assembly 14. The hitch frame assembly 14 has a forward extending tongue 15 that is capable of being mounted onto a tractor shown only fragmentarily at 16. The tilt frame assembly 13 has longitudinal extending side members 20 and suitable cross members 21 to hold the frame together. The axles for the wheels 12 are mounted onto this tilt frame 13 in a conventional manner. The tilt frame 13 also has center longitudinal members 22 which extend in the center of the unit and give it backbone strength.

The tilt frame assembly 13 and the hitch frame assembly 14 are pivotally mounted together as at 17 on each side thereof. The side members 20 and the side members for the hitch frame 14 overlap a substantial amount. This gives stability to the frame, and in the down position, stop members 18 prevent the tilt frame from falling downwardly past a level position with the hitch frame.

A rotating turntable or stack bed assembly illustrated generally at 23 includes a platform member 24 on which the hay is dumped as will be more fully explained, and this platform member 24 has a center shaft and plate 25 mounted in suitable bearings that in turn are attached to the center longitudinal member. (In FIG. 3 the platform is removed from the assembly.) The shaft and plate 25 hold the platform 24 in a centered position for rotation. The platform 24 also has a track 26 fixed to the bottom side thereof and also to the shaft and plate 25. The track is channel shaped, and has upper and lower flanges 27. The upper flange 27 is attached to the platform or bed 24. A lower flange 27 is adapted to ride on guide rollers 28 which are rotatably mounted in suitable positions on the frame of the machine. The rollers support the track 26 and thus the platform 24 in vertical direction, and permits the platform to rotate easily about the center shaft.

The platform 24 has upright hay retaining walls illustrated generally at 31. These walls 31 are made into a circular configuration as shown in FIG. 2 and are made in sections that can be removed. Two wall sections 32 and 33 are pivotally attached as at 34 and 35 respectively to the main wall section so that they can be swung open to permit a hay stack that is formed in the platform 24 to be slid outwardly to the rear in the direction as indicated by the arrow 36. Suitable fastening devices are used for holding the sections 32 and 33 together when the haystacker is being used. The walls can include screen or expanded metal mesh to keep hay from falling out between the upright slats.

The platform 24 is made in three sections. A center section 24A and outer sections 24B and 24C, one along each side. The outer sections are hinged to the center section with piano type hinges 24D having their axes extending in fore and aft directions. The outer sections are supported so they normally remain horizontal as shown. However, the hinges permit the outer sections to be folded toward the center of the platform after the walls 31 have been removed to reduce the width of the machine for transport. The folding side sections reduce the overall width of the machine so that it is about equal to the width of the frame.

The track 26 and thus the turntable assembly is driven rotationally about its upright mounting axis through the use of a chain 37 which drives against provided lugs on the outer surface of the web (the upright portion between flanges 27) of the track. The roller 28 are positioned below the track so that they do not interfere with the chain 37. The chain 37 is driven to rotate the platform during loading of hay.

GENERAL OPERATION

When the unit is to be used for loading hay, as can perhaps best be seen in FIG. 1, a windrow of hay illustrated at 40 is picked up with a hay pickup 41 of conventional design that has small spring teeth sticking out to pick up the windrow and it is then fed into a feed auger 42 which is rotatably mounted in a trough and made so that it will rotate and move the hay toward a center position of the unit. The auger has center fingers which feed the hay through a rear opening in the trough, across provided feeding guides 49 and then between two endless belts in a vertical conveyor assembly 43. The pickup 41 and the auger 42 are much like those used conventionally on hay balers and also on grain combines.

The hay is carried by the vertical conveyor assembly 43 upwardly and then is put onto a cross feed conveyor assembly 44. The cross feed conveyor 44 has an endless belt which feeds the hay laterally and the hay will drop off the end of this conveyor into the chamber formed by the walls 31 and down onto the platform 24. A free rolling rotating packing roller or member 45 is rotatably mounted onto the outer end of the cross feed conveyor in suitable bearings. This packer will roll over the hay that drops down onto the platform 24, and the unit 45 will thus be used for packing the hay. It should be noted that the hay drops off ahead of the packer so the packer rolls over the hay. The platform 24 is rotated under power as the hay is dropped from the conveyor. The hay is actually carried by the platform 24 around under the packer. The packer 45, when it is in its fully lowered position is adjacent the platform. The force holding the packer (and the lateral conveyor) is controlled so that it will exert a desired packing force on the hay that is dumped onto the platform. The conveyor assembly 44 is pivotally mounted to the upright conveyor 43 so that the conveyor can move about a horizontal axis up and down.

The vertical conveyor assembly 43 (including its outer frame 43A and the attached lateral conveyor 44) is mounted about a vertical axis to the upper end of a frame 46 which is positioned along the side members of the hitch frame. The frame 46 has upright poles 47 and 48 that join an upper cross member 51 at the upper portion thereof and the cross member in turn pivotally mounts the conveyor frame assembly for the conveyor 43 about an upright axis with a pin 51A. The lower end of the conveyor assembly 43 is mounted on a ball joint 53 (shown in FIG. 3 with the conveyor removed) to a rear cross member 52 of the hitch frame 14. The pin 51A is aligned with the ball joint in transverse position. The conveyor assembly 43 can be rotated about the axis of pin 51A and ball joint 53 through the use of a hydraulic cylinder 53A that will pivot the conveyor assembly 43 about this upright axis. The cylinder 53A is attached to the frame 46 and to a side member of the conveyor 43. The cylinder holds the conveyor assembly in position about its vertical axis. When the conveyor assembly 43 pivots, of course, the cross feed conveyor 44 also pivots and this will position the packer roller 45 at different positions along the platform. Two such positions are shown in dotted lines in FIG. 2.

The pivoting of the upright conveyor assembly about its upright axis relative to the auger 42 requires guide members that will flex so hay is still carried into the conveyor. These guides comprise several relatively narrow strips 49 of sheet metal that are guided for sliding movement with respect to the trough for the auger 42 and are attached to a lower cross member 49A on the frame member 43A of conveyor 43. Adjacent strips 49 overlap along their adjacent edges like a leafed shutter on a camera. Each strip is attached to the cross member with a single bolt so they will pivot from side to side as well as flex in and out. When the upright conveyor pivots about its upright axis, the strips flex and slide relative to the auger and also relative to each other, and continue to form a transition guide from the auger trough to the conveyor. The strips are fastened just below the rear belt of the conveyor assembly. The sliding guide for the free end of the strips 49 holds them in position on the auger trough when the conveyor pivots.

The conveyor support frame assembly 46 is made so that it can be folded rearwardly for transport. The poles 48 are pivoted, and by unfastening the lower end of poles 47 the entire unit can be folded rearwardly about the pivots of poles 48 and the ball joint 53. The pivots align in horizontal direction to permit this folding action. The conveyor can be laid partially down toward the platform 24 (the wall section 33 or 34 will be removed) to reduce vertical height. The side sections of the platform also are folded for transport to reduce the transverse width.

DRIVE TRAIN

Referring now to FIG. 4 in particular and the drives for the unit schematically shown on the drawing, it can be seen that a main power shaft 55 is driven from the power take-off of the tractor, and drives a chain 56 through its sprocket 57. The chain 56 in turn drives another sprocket 58 which drives a transfer shaft 59 rotatably mounted on the machine in a suitable manner and extending to the rear. The transfer shaft is mounted on the hitch frame 14 and drives a sprocket 60 that drives a chain 61 to in turn drive another sprocket 62 driving input shaft 63 of a gear box 64. The gear box 64 is a right angle drive gear box and is mounted on the machine in a suitable position. The output shaft 67 of the gear box has a sprocket 68 drivably mounted thereon and a chain 69 is driven by this sprocket. The chain 69 in turn drives another sprocket 70 that drives an idler shaft 71. The sprocket 72 is drivably mounted onto the shaft 71 and drives a chain 73. This chain 73 in turn drives a sprocket 74 that is drivably mounted onto a shaft 75 to drive the auger assembly 42. As shown in FIG. 4, the auger assembly has helical flights 76, and retractable fingers 77 which guide the hay into the opening in the auger trough. The retractable fingers 77 are of a conventional type used with header augers. The auger is rotated in the direction as indicated by the arrow 78.

The idler shaft 71 has an intermediate sprocket mounted thereon and this drives a chain 80 which in turn drives a sprocket on an idler shaft 81. Then, a V-belt 82 is mounted over a sheave 83 that is drivably mounted onto shaft 81 and this V-belt is twisted, to drive a sheave 84 that is drivably mounted onto the shaft 85 of the pickup 41. This gives the pickup the proper direction of rotation, namely that shown by arrow 86.

Thus the pickup is driven in the proper direction, and is driven at the same time the auger 42 is driven. All of these drives are tied together. The shaft 59 has another sprocket 89 mounted thereon and this drives a chain 90 that in turn drives a sprocket on an input shaft of a gear box 91. This is a right angle drive gear box, and the output shaft of the gear box is mounted through an universal joint 92 to a long telescoping power transfer shaft 93 which in turn is mounted through an universal joint 94 to the input shaft of a gear box 95. The gear box 95 is attached to one side of frame 43A for the conveyor assembly 43 and is used for transmitting power to this conveyor assembly. The shaft 93 telescopes to permit the conveyor assembly to pivot about its upright axis. The output shaft of the right angle drive gear box 95 drives a sprocket 96 that in turn drives a chain 97. This chain 97 drives a sprocket 98 that is drivably mounted onto a shaft 99. The shaft 99 has a roller 100 thereon and this roller is used to drive a conveyor belt 101 for the rear conveyor of the conveyor assembly 43. The belt 101 is an endless conveyor belt mounted over the roller 100, and over a roller 101A that is rotatably mounted onto the frame 43A of the conveyor assembly at the lower portions thereof adjacent the auger 42. The endless belt 101 is driven in direction as indicated by the arrow 102, so that the inner reach of the belt is going upwardly.

A second sprocket is also mounted onto the shaft 99 and this second sprocket drives a chain 105 that in turn drives a sprocket 106 to drive a shaft 107. The shaft 107 has a roller 108 mounted thereon and this roller 108 drives a conveyor belt 109 for the upper or cross feed conveyor 44. The belt 109 has an upper reach that travels in the direction as indicated by the arrow 110. Thus when the conveyor belt 101 is driven, so is the cross feed or lateral conveyor belt 109. The outer end of the cross feed conveyor belt 109 is mounted onto a roller 111 that is rotatably mounted in the conveyor frame 112 (see FIG. 1). The frame 112 has a pair of side members that are pivotally mounted with bearings onto the shaft 99 for the upper conveyor. The conveyor frame 112 will pivot about this shaft when it is controlled through the use of a hydraulic cylinder control.

The opposite end of shaft 99 from sprocket 98 has a V-belt sheave 115 drivably mounted thereon (see FIG. 1), and this drives a crossed V-belt 116. The belt 116 in turn drives a sheave 117 that is mounted onto an idler shaft 118. The idler shaft 118 is suitably rotatably mounted onto one of the frame members 43A for the upright conveyor assembly 43. A second sheave 119 is also drivably mounted onto the shaft 118 and this drives a V-belt 120 which in turn drives a sheave 121. The sheave 121 is drivably mounted onto a shaft 122 that in turn drivably mounts a roller 123. The roller 123 comprises the upper roller for a conveyor belt 124. This conveyor belt 124 is the forward one of the two belts making up the conveyor assembly 43, and its inner reach also travels in direction as indicated by the arrow 102. The lower portions of the conveyor belt 124 are mounted onto a roller 125 that in turn is rotatably mounted on suitable bearings on the sides 127 of a floating frame for the conveyor assembly through the use of a shaft 126.

Thus the two inner reaches of the front and rear conveyor belts 124 and 101, respectively, travel in the same direction and adjacent each other to carry hay between them upwardly and deposit it onto the upper surface of the cross conveyor belt 109 and then to be carried and dropped off the cross conveyor belt between the end roller 111 and the packer roller 45. The forward belt 124 has its ends spaced upwardly from the rearward belt to help hay feed into the belts at the bottom and onto the cross conveyor at the top.

The forward conveyor belt 124 is mounted onto the end rollers 123 and 125 and the rollers are rotatably mounted on bearings attached to spring loaded floating frame side members 127. The upper roller shaft 122 and the side members 127 are supported on bearings in pivot arms 128 that are pivotally mounted to the main side frame members 43A of the conveyor assembly. The arms 128 are pivotally mounted on the axis of shaft 118 (see FIG. 5 for typical showing). The floating frame members 127 are mounted on shaft 122 with suitable bearings and then extend from roller 123 to support roller 125 and shaft 126 on bearings. The lower portions of each of the side floating frame members 127 have guide rods 127A attached thereto and extend through a cross strap 127B which is fixed to and extends between the main side frame members 43A of conveyor 43. Compression springs 127C are provided to resiliently mount the forward conveyor belt and permit it to move outwardly relative to the rear belt if large slugs of hay enter, or if the hay is heavy. The springs 127C mount over the rods 127A and exert force between the strap 127B and the side frame members 127.

The upper ends of the forward conveyor floating frame are also spring loaded to permit the frame to move forwardly slightly. Guide rods 128A are attached to each of the frame members 127 and slidably extend through a cross member 128B which is fixed to the main side frame members 43A. Compression springs 128C are mounted over the guide rods 128A between members 128B and the floating frame members. Movement of the upper portion of the front conveyor is controlled by the arms 128 and resisted by the springs 128C. Stops are provided to give a minimum spacing between the two conveyor belts so they do not get too close together.

It should be noted that pivoting arms such as 128 can be provided to support roller 125 for movement if desired.

As can be seen, the packer roller has a center shaft 130 that is rotatably mounted in suitable bearings onto side members 131 on the frame 112. The shaft 130 is skewed with respect to the conveyor. In other words, it is cocked with respect to the axis of the shafts 107 and the shaft for roller 111, for example, and inclined so that the inner end which is shown in FIG. 4 is positioned upwardly and forwardly from the outer end. The roller 45 has outer corrugations or flutes 132 that ride against the hay. The roller is skewed so that it does not tend to throw the hay outwardly against the walls 31, but as the platform 24 rotates, the roller will rotate on top of the moving hay and will tend to put the hay in toward the center slightly. The outer corrugations 132 of the packer 45 are tapered so that the peripheral speed of the packer is substantially the same speed as the hay moving underneath it all along its axis and this prevents the tendency of the packer to twist any of the hay at all.

The transfer shaft 59 has an end sprocket 135 drivably mounted thereon and this sprocket is the one that powers the drive to the rotating platform 24 and to the hay stack push off. The sprocket 135 drives a chain 136 which in turn drives a sprocket 137. The sprocket 137 is drivably mounted onto a shaft 138. The shaft 138 is rotatably mounted on suitable bearings onto the rear portion of the hitch frame 14. All of the previous shafts and sprockets also have been mounted to move with the hitch frame 14. The shaft 138 extends rearwardly from the hitch frame and has a fairly large size cylindrical drum 139 drivably mounted thereon near the outer end thereon. The drum 139 has a smooth cylindrical outer surface. In addition, the shaft 138 has a sprocket 140 drivably mounted thereon between the sprocket 137 and the drum 139 and this sprocket 140 drives a chain 141 which in turn drives a sprocket drivably mounted onto a shaft 142. The shaft 142 is also rotatably mounted onto a framework connected to the hitch frame 14 on suitable bearings. The shaft 142 has an universal joint in the center section and the outer end portion is cocked downwardly and held in bearings. This is to help with alignment of the double sheave 143 that is drivably mounted at the outer end of the shaft, with the sheaves driven from sheave 143. The sheaves driven by sheave 143 are on the tilt frame and drive only when the frame is tilted. The tilt frame assembly mounts the rotating turntable assembly and its associated drives. In the position of the tilt frame shown on solid lines in FIG. 1, the drive members drive the turntable about its axis, and when the frame is tilted to remove a stack from the platform, a hay stack push off device is driven so that the stack will be pushed off the platform. Of course, when the push off is operated, the platform does not rotate. Thus there is a dual drive utilized to the components in the tilt frame assembly, and only one of the drives is operative in each of the positions of the tilt frame.

A shaft 147 is rotatably mounted in a framework that is attached to the tilt frame 13. This framework is illustrated generally at 148 in FIG. 3. The framework is attached to the front cross member 21 of the tilt frame assembly 13. The framework for supporting the shafts 142 and 138 is shown at 137' in FIG. 3 and is attached to the rear cross member 52 of the hitch frame assembly 14.

A pneumatic tire 149 is mounted onto a wheel 150 that is drivably mounted on the shaft 147. When the tilt frame is in its down position as shown in solid lines in FIG. 1, the pneumatic tire resiliently engages the surface of drum 139, so that when the drum 139 rotates the tire will be rotated and this in turn will drive the shaft 147. A double V-belt sheave 151 is drivably mounted onto the shaft 147. A pair of V-belts 152 mount over the shaft 151 and go down to the sheave 143. These V-belts are slack when the tilt frame is in its down position as shown in FIG. 1 and there is no power connection between the V-belts. Suitable belt guides are provided to keep the belts from falling off the sheaves.

However, when the tilt frame is tilted to dump a stack the sheave 151 moves upwardly with the front portions of the tilt frame and tightens the belt 152 so that there is a driving connection between the sheave 143 and sheave 151. Then, however, the tire no longer contacts its drive drum 139 and thus the shaft 147 is driven only by the V-belts 152. At the outer end of the shaft 147 an universal joint 153 is drivably mounted. A power shaft 154 is connected between one end of the universal joint 153 to another universal joint 155 which in turn is drivably connected to the input shaft 156 of a worm gear reduction box illustrated at 157. The output shaft of the worm gear box is double ended (extends out both sides of the box), and on the bottom side a sprocket drives a chain 162 which in turn drives another sprocket 163. The sprocket 163 is mounted onto a shaft 164 that is rotatably mounted in suitable bearings onto one of the cross members of the tilt frame 13. The upper end of the shaft 164 has a large sprocket 165 mounted thereon. The sprocket itself is rotatably mounted onto the shaft and a oneway ratchet type drive unit 166 is used for drivably connecting the sprocket 165 to the shaft 164 so that the sprocket will only drive in one direction and will free wheel when it is driven in the opposite direction (the platform is driven only oneway). This means that the sprocket 165 is designed so that it will only rotate in direction as indicated by arrow 167, and when the shaft 164 is rotated in the opposite direction, the sprocket 165 is not driven, but rather the oneway drive connection free wheels. This can be any type of ratchet dog or other oneway drive. The sprocket 165 drives a large chain 37 that is used for rotating the track 26, and thus rotates the turntable assembly that is attached to the track.

Mounted onto the platform 24, which rotates with the track, is a push off device for hay stacks. This push off device and the drive chains for it all rotate with the platform. The push off device includes a curved cross bar 170 which is mounted onto attachment members 171,171 positioned adjacent opposite ends thereof. The attachment members in turn are removably drivably clipped in a desired manner to links of separate chains 172, 173, respectively. The chains 172 and 173 are mounted over idler sprockets 174 and 175 adjacent the rear portions of the platform. The sprockets 174 and 175 are mounted on shafts that are rotatably mounted on the platform 24 in a suitable manner. The attachment members 171, when clipped to the chain in a usual manner move with the chain. The attachment members can be detached manually to reset the push off after a stack has been removed. The attachment members can be attached to the links with bolts, pins, or spring clips.

Adjacent the front end of the platform as shown in FIG. 2, a pair of drive sprockets 176 and 177 are mounted. These in turn mount the chains 172 and 173 respectively. Note that the chains 172 and 173 have shields over them to prevent hay from getting into them. The drive sprockets 176 and 177 are drivably mounted on the shafts 178 and 179 respectively and extend downwardly through the platform. There are sprockets mounted on the bottom ends of the shafts 178 and 179, and each of these sprockets are driven by a chain 180 and 181 respectively. The chains in turn are drivably mounted onto sprockets 182 and 183, respectively. The sprockets 182 and 183 are in turn mounted below the platform 24 and are mounted for rotation about upright axes. Both of the sprockets 182 and 183 are drivably attached to a relatively large hub that is rotatably mounted with respect to the platform. A center hub drive link 185 is slidably mounted on the interior of this hub for up and down movement. The top portion of this drive link extends above the platform and is accessible from the top of the platform. The drive link has a female receptacle at the lower end thereof which will slip over a driving member 186. The driving member 186 is drivably mounted onto a sprocket 187. The lower end of this driving member 186 is rotatably mounted onto the tilt frame 13. The sprocket 187 is driven by chain 188 from a sprocket 189 that in turn is drivably mounted to the output shaft of the gear box 157 on an opposite end of the shaft from the side where chain 162 is driven.

When the link 185 is raised as shown in FIG. 4 there is no driving connection between the link 185 and the driving member 186. However when the link is moved so that a driving lug 190 will slip into a provided groove 191 on the hub for the sprockets 182 and 183, the driving link 185 drops far enough down so that when the platform 24 is properly positioned so the link is aligned over the driving member 186 (the link rotates with the platform and the member 186 stays with the frame), the link will slip over member 186 and there will be driving connection between the member 186 and the link 185.

Thus there will be a driving connection between the stud or driving member 186 and the push off drive for the hay. Of course, when the driving link 185 is in position on member 186 it will prevent the platform 24 from rotating because the sprockets 182 and 183 move with the platform, and the driving member 186 remains with the frame 13. Thus only one of the drives, either to the platform or to the push off is used at once. If the drive to the push off should be accidentally engaged when the tilt frame is in its lowered position, the rubber tire 149 will slip against the drum 139 so that no damage will result from the attempt to drive the platform in a rotational direction about its upright axis and the push off at the same time.

A tilt control framework 200 is attached to the tilt frame assembly front cross member 21, and the rod end of a hydraulic cylinder 201 (it is a retractable and extensible hydraulic cylinder-piston assembly of conventional design) is attached to the tilt control frame 200. The base end of the hydraulic cylinder-piston assembly 201 is attached as at 202 to a bracket 203 that in turn is fixed to the cross member 52 of the hitch frame 14. The tilt frame can be tilted by operating the controls from the hydraulic control valve 204 that is mounted onto a support post 205 adjacent the tractor operator and extending the rod of the piston-cylinder assembly 201. This will cause the two frames 13 and 14 to separate lifting the front edge of the tilt frame 13 with respect to the hitch frame 14 about the pivot bolts 17. The unit will move to position as shown in FIG. 7. When this happens, the tire 149 moves away from the drum 139, and the V-belts 152 tighten to cause a driving connection between the pulley 143 and the pulley 151. It should be noted that the direction of rotation of shaft 147 is reversed when the belts 152 drive the shaft from its rotational direction when tire 149 is the driver.

HAY PACKING

The cross conveyor frame 112, as stated previously, is pivotally mounted for movement about the axis of shafts 99 through the use of suitable bearing blocks extending from the frame 112 to this shaft. The position of the frame 112 about the axis of the shaft 99 is controlled through a linkage shown in FIGS. 1 and 5. This linkage includes a bracket 210 that is fixed to one side frame member of the frame 112 (there are two side members of the frame 112, one on each side of the conveyor belt 109). A folding linkage member comprising a first link 211 is pivotally mounted to the bracket 210 near the lower end thereof, and a second link 212 is pivotally mounted to the outer end of a link 211. The link 212 in turn is pivotally mounted to a suitable bracket 213 fixed to the frame for the conveyor assembly 43. A double acting hydraulic cylinder-piston assembly 214 is mounted to a bracket 215 attached to the side frame for the upright or vertical conveyor assembly 43. The cylinder assembly 214 has an extendable and retractable rod 216, and the outer end of the rod has a clevis that is pivotally mounted as at 217 to an intermediate portion of the link 212. Extending the rod 216 to position as shown in solid lines in FIG. 1 will cause the frame 112 to raise way up as shown. Retracting the rod of the hydraulic cylinder assembly will cause the frame 112 to come downwardly. The frame 112 can actually come down so far that the packer 45 is closely adjacent the platform 24 of the unit so that it will pack hay almost as soon as hay is dropped into the cage or compartment formed by the walls on the platform 24.

The hydraulic cylinder assembly 214 is utilized for maintaining a load on the packer assembly as well as for raising and lowering the unit. The hydraulic cylinder assembly has a rod end inlet 218 which is connected through the hydraulic control valve assembly, and a base end inlet 219, also connected to the control valve. These two inlets are connected together with a connection pipe 220 that has a relief valve 221 therein. The normal inlet line for the base end of the hydraulic cylinder assembly connects between the relief valve 221 and the cylinder so that it can operate in a normal fashion. The relief valve will not permit flow in direction from the base to the rod inlet, but will open to permit flow in opposite direction if the pressure exceeds the relief setting. When the force on the frame 112 due to the building up of hay under the roller 45 in its lower position, in particular, becomes large enough, the linkage 211 and 212 will try to extend the rod 216. Hydraulic pressure will build up inside the hydraulic cylinder-piston assembly at the inlet 218 and this will act on the relief valve 221. When this pressure builds up to a high enough level the relief valve will open permitting the rod 216 to extend and oil will then flow into the base end of the cylinder and then will permit the packer to raise under load. In this manner, a constant load can be applied to the hay being stacked through the rotating packer 45. The pressure is used to pack the hay under a preset desired load so that adequate packing is achieved. The relief valve 221 can be adjusted to any desired level to get the amount of packing necessary for the hay being stacked.

A hay control hood 225 covers the conveyor belt 109 of lateral conveyor assembly 44 and extends between the side members of the frame 112. It is slidably mounted on these members in suitable guides so that it can move longitudinally along the conveyor belt. The positioning of the hood 225 is controlled through the use of a lever 226 that is fixed to the link 211 and moves with the link. The lever in turn slidably mounts through a slotted connecting bracket 227 that is fixed to the side member of the hood 225. The hood 225 is like an inverted U-shaped member. Also, a suitable guide sheet of metal can be provided over the upper end of the vertical conveyors to the hood 225 so that the hay is guided onto the conveyor belt 109 when it leaves the vertical conveyor belts. When the frame 112 is in its raised position the hood 225 is slid toward the packer by the action of the lever 226 acting through the connecting link 227 so that the hay coming off the conveyor belt 109 is prevented from flying upwardly and when the frame 112 is in a lowered position, the lever 226 will move the hood 225 rearwardly (see FIG. 5) because as the link 211 folds the lever 226 will tend to move toward the base end of the lateral conveyor assembly 44. This will also then act through the member 227 to slide the hood 225 back toward the vertical conveyors.

OPERATION

The unit is power take off driven and is attached to a tractor of suitable size. The hay is cut and raked into windrows in a known manner. The power take off shaft 55 is engaged and this drives the shaft 59. When the unit is in its picking up position, all of the components such as the pick up, the auger, and the cross feed conveyor are being driven as previously described. In addition, the tire 149 is engaging the drum 139 resiliently and is driving the shaft 147. The belts 152 are slack in this position as stated previously so that the pulley 143 slips. The output shaft for the worm gear box 157 is rotating, driving chain 162, which in turn drives the sprocket 165 through the oneway drive connection 166. The sprocket 165 will be rotating as indicated by the arrow 167 and will rotate the track and platform 24 together with the walls mounted on the platform in a circular direction about a central axis. The platform or bed 24 is guided by the support rollers. The link 185 is retracted so there is no connection between the driving member 186 and this driving connecting link 185. This will permit the platform 24 to rotate. The push off assembly and cross bar 170 will be positioned so that it is toward the walls that are fixed to the platform and adjacent sprockets 176 and 177.

The unit will then be moved down the field and the pickup 41 will pick up the hay from the windrow, direct it to the auger 42, and then through suitable guide members the hay will be directed between the conveyor belts 101 and 124 so that the hay is moved upwardly in direction as indicated by the arrow 102 in FIG. 4. The belts are of proper speeds and are rotating in the proper direction to direct hay upwardly. The hay will be guided by the guide members underneath the hood 225 and onto the conveyor belt 109. When the unit is initially started the lateral conveyor 44 will be in a lowered position with the packer member 45 closely adjacent the platform 24. The relief valve 221 for the cylinder 214 will be set at the desired level and the hay will be dropped down onto the platform 24 between the packer 45 and the outer end of conveyor belt 109. As the hay drops onto the platform, it will be carried rotatably around with the platform as the platform rotates. This means that the hay must pass underneath the free rotating packer 45.

The packer member will thus press on the hay compacting it against the platform 24 and as the hay continues to build, the packer member will exert a greater force on the hay until the pressure at the rod end of the cylinder 214 from the force of the hay exceeds the setting of the relief valve 221. Then the packer member will start to raise because the force will cause the rod 216 to extend. The hay will continue to be built up as it is picked up, and the packer member will continue to pack the hay within the walls 31 as the hay fills up these walls.

The vertical conveyor can be moved about its vertical axis namely ball joint 53 and pin 51A with respect to the frame 46 so that the hay and packer can be positioned adjacent the walls on the platform, or can be moved adjacent the axis of rotation. During packing, the conveyor assembly will be moved to place the hay across the entire radius of the platform as the platform rotates. Then, when the hay is built up so that it is higher than the top of the walls 31 the stack will be automatically "topped" by directing the hay more toward the center of the platform rather than the area overlying the outer peripheral edges of the platform. The movement of the conveyor determines where the hay will go and the stack can be rounded off almost perfectly as shown in dotted lines in FIG. 1.

The packer 45 will continue to apply force onto the hay to pack it due to the pressure built up in the cylinder 214 which restrains the upward travel of the cross conveyor. When the stack is completely made the operator will quit picking up hay, disengage the power and will move the stacking machine to the place where the stack is to be deposited. The platform will then be run until the push off frame and its associated drive components are positioned properly. This is with the push off at the forward portions of the tilt frame 13 so that the connecting drive link 185 overlies the driving member 186. Then the driving member will be engaged by dropping the link down so that the female receptacle of the link fits over the driving member 186 (it is a square shaft as shown) and the tilt frame will be tilted. The cylinder 201 is extended to tilt the tilt frame 13 relative to the ground so that the rear portions of the platform slope downwardly. This is shown in FIG. 7. The connection to the tractor permits the hitch frame to tilt. The doors or movable wall portions 32 and 33 will be opened and will be swung away so that the stack can be pushed off.

The power take off will then again be engaged. At the time that the tilt frame 13 is tilted, the tire 149 moves away from the drum 139, and the belts 152 tighten. This reverses the direction of drive on the shaft 147 because the belts 152 will now drive from the sheave 143 and will reverse the direction of rotation of shaft 147 and reverse the direction of drive of the gear box 157. The oneway drive 166 for the sprocket 165 will free wheel so that the platform will not be rotated. The chain 188 will be driving sprocket 187, and driving member 186, and therefore will rotate the drive link 185. The link 185 in turn will drive through the lug 190 (which will be in slot 191) and drive the hub for the sprockets 182 and 183. This then will drive the chains 172 and 173 so that the push off moves in direction as indicated by the arrow 183. The push off, which is mounted on the top of the platform 24 will then push the stack rearwardly off the platform and the stack will be deposited onto the ground. The machine can be pulled ahead slightly as the stack is unloaded so that the stack does not have to be slid across the ground, and the platform will effectively be pulled out from under the stack. The push off can be manually unclipped from the chains 172 and 173, moved to its initial position at the front and reattached to the chains so it is ready to go again.

The hydraulic cylinder 201 will then be retracted to its original position and the unit is ready to make another stack. Of course, the cylinder 214 will be operated so that the frame 112 is back to its lowered position adjacent the top surface of the platform 24. As soon as hay is deposited it will again be packed.

Thus we have a complete hay stacking machine which will pick up hay in loose form from windrows, put it onto a rotating turntable for making a round stack, pack it uniformly without a person being in the stack, and which permits the dumping or depositing of the hay stack onto the ground when it has been completed. The uniform packing pressure from the packing member insures a very good hay stack. The stack is uniformly made throughout its cross section, and the power requirements are minimized because there is no need for blowing the hay into corners or for relying upon a blower for transporting the hay. Neither is there any need for stopping to compress the hay for packing through the use of a compression type member because the packing takes place automatically and continuously as the hay is deposited and the platform is rotating. The stack can be topped by rotating the vertical conveyors about their upright axes so that the hay is deposited in the proper location. The drive to the turntable is dual purpose. It is used for driving the platform when hay is being picked up, and also for driving the push off when the hay stack that has been made is to be removed.

Although in actual practice the unit works exactly as shown, the cylinder 214 can be provided with suitable means for compensating for the difference in volume between the rod end and base end of the cylinder, if desired. The rod 216 could extend out both ends of the cylinder to equal the volume of a valve providing make up oil to the base end could be furnished.

What is claimed is:

1. In a stacking machine for hay or the like, a frame, hay pick up means and conveyor means on said frame, a platform on said frame positioned to receive hay from said conveyor means, means to rotatably mount said platform for rotation about an upright axis, packing means to selectively engage hay deposited on said platform when the hay has reached a predetermined height on said platform and to exert a packing pressure against said hay in relation to said platform as hay is deposited thereon, said packing means being positioned so as to exert packing pressure as said platform rotates, and power means to rotate said platform.

2. The combination as specified in claim 1 wherein said platform has substantially circular side walls, and means to permit opening said side walls to remove hay collected on said platform.

3. The combination as specified in claim 1 wherein said conveyor means includes an upright conveyor means and a lateral hay conveyor means pivotally mounted about a substantially horizontal axis to said upright conveyor means, said lateral conveyor means being in position to receive hay from said upright conveyor means and convey hay in a lateral direction overlying said platform, said packing means being mounted onto said lateral conveyor means, and means to resist upward movement of said lateral conveyor means when said packing means is engaging said hay.

4. The combination as specified in claim 3 wherein portions of said conveyor means are mounted about a substantially upright axis, and means to pivot said conveyor portions from side to side for a limited distance about said upright axis.

5. The combination as specified in claim 3 wherein said upright conveyor means comprises two belt members, means to mount one of said belts for limited movement relative to the other belt member including bias means to urge said one belt to a first position.

6. The combination as specified in claim 1 wherein said packing means comprises a rolling member rotatably mounted about a predetermined axis and having peripheral surfaces engaging hay deposited on said platform, said rolling member being free to roll as said platform and hay carried thereon pass beneath said rolling member in a circular path about the axis of rotation of said platform.

7. The combination as specified in claim 1 wherein said frame comprises two frame sections, a first of said frame sections being mounted on a plurality of support wheels and supporting said platform, and a second of said sections having means thereon adapted to be supported on a prime mover, a transverse pivot connection between said first and second frame sections, said pivot connection being located in position between the support wheels and the prime mover, and hydraulic cylinder means adapted to control movement of said frame sections relative to each other about said pivot connection from a first normal position wherein the first frame section is positioned with the platform substantially horizontal to a second position wherein the first frame section tilts and the portions of said first frame section on the opposite side of said support wheels from said pivot connection can be moved to position closely adjacent the ground.

8. The combination as specified in claim 7 wherein said power means for rotating said platform about its axis comprises driving means between said first and second frame sections, said driving means including first and second friction drive members, said first friction drive member being positioned on said first frame section and said second friction drive member being positioned on said second frame section, said friction drive members engaging each other for frictionally driving said platform when said frame is in a first position, and said friction members disengaging when said frame sections are moved about their pivot connection from said first normal position.

9. The combination as specified in claim 7 wherein said means for rotating said platform about its axis comprises friction drive member, said friction drive member including an inflatable tire driven by said power means and frictionally engaging a second drive member.

10. The combination as specified in claim 1 and means mounting said packing means to permit said packing means to move upwardly as hay builds up on the top of said platform, and control means to exert a pressure resisting upward movement of said packing means with a preselected force.

11. The combination as specified in claim 7 and hay push off means mounted on said platform, means to drive the push off means in a direction toward the rear of said platform to move material on said platform toward the rear thereof, said means to drive said push off means including first driven means on said first frame section and power means on said second frame section, and a second driving connection between said first and second frame sections whereby said second driving connection is operatively connecting said power means to said driven means when said frame sections are moved from said first position to said second position.

12. The combination as specified in claim 10 wherein said second driving connection comprises a belt and pulley connections, a first pulley being on said first frame section and a second pulley being on said second frame section, said belt being loose when said frame sections are in said first position and being tight to transmit power between said pulley means when said frame sections are pivoted about their pivot connections to said second position.

13. The combination as specified in claim 11 wherein said means to drive said push off includes second driven means mounted on said rotating platform, said first driven means mounted on said first frame section, including a gear box, a first drive from said gear box including oneway drive means to rotate said platform under power from said gear box, and a second drive from said gear box including a male driving member, a slidable connecting power link on platform for said driven members and adapted to drivably engage said male driven member with the platform in a first position, said oneway drive being operable to drive said platform when said first driving connection is engaged, the direction of drive thereof being reversed when said second driving condition is engaged, and said push off thereby being moved in direction from the forward portions of said platform to the rear portions thereof when said platform is in its first predetermined position and said second driving connection is operative.

14. A hay stacking machine including a frame, a pickup means and hay conveyor means on said frame, a platform on said frame in position to receive hay from said conveyor means, means to rotatably mount said platform with respect to said frame for rotation about an upright axis, drive means for rotating said platform, said frame comprising first and second frame sections, means to pivotally mount said frame sections together about a transverse axis, means to control movement of said frame sections between a first position wherein said platform is substantially horizontal to a second position wherein said first frame section is tilted with respect to the second frame section so that a portion of said platform is adjacent the ground, a push off device on said platform to move material on the platform in a first direction, and drive means extending between said first and second frame sections including a first driving member engageable when said frame sections are in said first position and operative to drive drive means to said platform about its rotational axis, and a second drive member disengaged when said frame sections are in said first position, and engaged when said frame sections are in said second frame position, said second drive member being operable to drive said push off device and to reverse the direction of drive to said platform, said drive means to said platform including a oneway drive means that free wheels when said second drive member is engaged.

15. In a stacking machine for a forage crop material such as hay, a frame, means to mount said frame for movement over the ground, a platform on said frame, a crop material pickup means ahead of said platform, conveyor means on the frame to transfer the crop upwardly and rearwardly to deposit the crop on said platform, means to mount at least portions of said conveyor means on said frame about a substantially upright axis, and means to permit pivoting said conveyor means from side to side for a limited distance about said upright axis.

16. In a stacking machine for a crop material such as hay, a frame, pick up and conveyor means on said frame for moving crop material upwardly and rearwardly, a platform on said frame positioned to receive crop material from said conveyor means, means to movably mount said platform on said frame, packing means to exert a packing pressure against crop material on said platform, said packing means being mounted so as to exert packing pressure on said crop material as said platform moves, and means to move said platform relative to said frame as said machine picks up crop material.

17. The combination as specified in claim 16 including means to mount said packing means about a substantially horizontal axis to said frame, said packing means being mounted onto said conveyor means, and means to yieldably resist upward movement of said packing means when said packing means is engaging hay on said platform.

18. The combination as specified in claim 16 wherein said packing means comprises a rolling member rotatably mounted about a predetermined axis and having peripheral surfaces engaging crop material deposited on said platform, said rolling member being free to roll as said platform and crop material carried thereon pass beneath said rolling member as said platform moves relative to said frame.

19. The stacking machine of claim 15 wherein said platform is rotatably mounted on said frame and packing means for engaging and packing forage crop material deposited on said platform as said platform rotates and exerting a pressure on said crop material as the material accumulates on said platform.

20. The stacking machine of claim 19 wherein said packing means comprises a drum rotatably mounted on portions of said conveyor means, said drum being movable with portions of said conveyor means about an upright axis toward and away from the rotational axis of said platform.

21. The stacking machine of claim 19 and means mounting the portion of said conveyor means on which the packing means are mounted about a generally horizontal axis, and means controlling movement of the packing means about said generally horizontal axis.

22. The machine of claim 16 wherein said platform is substantially wider than said frame in usable position, said platform being divided into a plurality of sections, and means joining said sections to permit moving at least one section relative to the other to reduce the width of said platform.

* * * * *